United States Patent
Liu et al.

(10) Patent No.: US 9,751,053 B2
(45) Date of Patent: Sep. 5, 2017

(54) ASYMMETRIC INTEGRALLY-SKINNED FLAT SHEET MEMBRANES FOR H$_2$ PURIFICATION AND NATURAL GAS UPGRADING

(71) Applicant: UOP LLC, Des Plaines, IL (US)

(72) Inventors: Chunqing Liu, Arlington Heights, IL (US); Howie Q. Tran, Skokie, IL (US)

(73) Assignee: UOP LLC, Des Plaines, IL (US)

(*) Notice: Subject to any disclaimer, the term of this patent is extended or adjusted under 35 U.S.C. 154(b) by 0 days.

(21) Appl. No.: 14/497,743

(22) Filed: Sep. 26, 2014

(65) Prior Publication Data

US 2016/0089640 A1    Mar. 31, 2016

(51) Int. Cl.
| | |
|---|---|
| *C08L 77/00* | (2006.01) |
| *B01D 71/68* | (2006.01) |
| *B01D 53/22* | (2006.01) |
| *B01D 67/00* | (2006.01) |
| *B01D 69/06* | (2006.01) |
| *B01D 71/64* | (2006.01) |

(52) U.S. Cl.
CPC ............ *B01D 71/68* (2013.01); *B01D 53/228* (2013.01); *B01D 67/009* (2013.01); *B01D 69/06* (2013.01); *B01D 71/64* (2013.01); *B01D 2323/30* (2013.01); *B01D 2323/345* (2013.01); *B01D 2325/022* (2013.01); *B01D 2325/04* (2013.01)

(58) Field of Classification Search
CPC ............ C08G 73/1042; C08G 73/1053; C08G 73/1064; C08G 73/1067; C08G 73/1007; C08G 73/1025; C08G 73/10
USPC ........................ 528/310; 525/432, 436; 502/4
See application file for complete search history.

(56) References Cited

U.S. PATENT DOCUMENTS

| | | | | |
|---|---|---|---|---|
| 4,415,608 A | * | 11/1983 | Epperson ............... | B01D 69/10 156/244.24 |
| 5,480,554 A | * | 1/1996 | Degen .................. | B01D 65/102 210/500.41 |
| 5,702,503 A | * | 12/1997 | Tse Tang ........................... 95/45 | |
| 7,247,191 B2 | | 7/2007 | Koros et al. | |
| 7,485,173 B1 | | 2/2009 | Liu et al. | |
| 8,016,124 B2 | | 9/2011 | Yates et al. | |
| 8,337,598 B2 | | 12/2012 | Yates et al. | |
| 2010/0269698 A1 | * | 10/2010 | Yates et al. ....................... 96/10 | |
| 2011/0290112 A1 | * | 12/2011 | Liu et al. .......................... 95/54 | |
| 2012/0322646 A1 | * | 12/2012 | Liu et al. .......................... 502/4 | |

OTHER PUBLICATIONS

Inami et al. (Derwent JP 2006089861).*
U.S. Appl. No. 14/497,717, filed Sep. 26, 2014.

* cited by examiner

*Primary Examiner* — Shane Fang

(57) ABSTRACT

An asymmetric integrally-skinned flat sheet membrane comprising a miscible blend of an aromatic polyethersulfone (PES) polymer and an aromatic polyimide polymer is used for gas separations such as hydrogen purification, separation of hydrogen and methane and to separate other gases and liquids. UV radiation may be applied to the surface of the membrane for improved properties.

7 Claims, No Drawings

ASYMMETRIC INTEGRALLY-SKINNED FLAT SHEET MEMBRANES FOR H$_2$ PURIFICATION AND NATURAL GAS UPGRADING

BACKGROUND OF THE INVENTION

This invention relates to asymmetric integrally-skinned flat sheet membranes and methods for making and using these membranes.

In the past 30-35 years, the state of the art of polymer membrane-based gas separation processes has evolved rapidly. Membrane-based technologies have advantages of both low capital cost and high-energy efficiency compared to conventional separation methods. Membrane gas separation is of special interest to petroleum producers and refiners, chemical companies, and industrial gas suppliers. Several applications of membrane gas separation have achieved commercial success, including N$_2$ enrichment from air, carbon dioxide removal from natural gas and from enhanced oil recovery, and also in hydrogen removal from nitrogen, methane, and argon in ammonia purge gas streams. For example, UOP's Separex™ cellulose acetate spiral wound polymeric membrane is currently an international market leader for carbon dioxide removal from natural gas.

Polymers provide a range of properties including low cost, permeability, mechanical stability, and ease of processability that are important for gas separation. Glassy polymers (i.e., polymers at temperatures below their $T_g$) have stiffer polymer backbones and therefore let smaller molecules such as hydrogen and helium pass through more quickly, while larger molecules such as hydrocarbons pass through more slowly as compared to polymers with less stiff backbones. Cellulose acetate (CA) glassy polymer membranes are used extensively in gas separation. Currently, such CA membranes are used for natural gas upgrading, including the removal of carbon dioxide. Although CA membranes have many advantages, they are limited in a number of properties including selectivity, permeability, and in chemical, thermal, and mechanical stability.

The membranes most commonly used in commercial gas and liquid separation applications are asymmetric polymeric membranes and have a thin nonporous selective skin layer that performs the separation. Separation is based on a solution-diffusion mechanism. This mechanism involves molecular-scale interactions of the permeating gas with the membrane polymer. The mechanism assumes that in a membrane having two opposing surfaces, each component is sorbed by the membrane at one surface, transported by a gas concentration gradient, and desorbed at the opposing surface. According to this solution-diffusion model, the membrane performance in separating a given pair of gases (e.g., CO$_2$/CH$_4$, O$_2$/N$_2$, H$_2$/CH$_4$) is determined by two parameters: the permeability coefficient (abbreviated hereinafter as permeability or $P_A$) and the selectivity ($\alpha_{A/B}$). The $P_A$ is the product of the gas flux and the selective skin layer thickness of the membrane, divided by the pressure difference across the membrane. The $\alpha_{A/B}$ is the ratio of the permeability coefficients of the two gases ($\alpha_{A/B}=P_A/P_B$) where $P_A$ is the permeability of the more permeable gas and $P_B$ is the permeability of the less permeable gas. Gases can have high permeability coefficients because of a high solubility coefficient, a high diffusion coefficient, or because both coefficients are high. In general, the diffusion coefficient decreases while the solubility coefficient increases with an increase in the molecular size of the gas. In high performance polymer membranes, both high permeability and selectivity are desirable because higher permeability decreases the size of the membrane area required to treat a given volume of gas, thereby decreasing capital cost of membrane units, and because higher selectivity results in a higher purity product gas.

One of the components to be separated by a membrane must have a sufficiently high permeance at the preferred conditions or an extraordinarily large membrane surface area is required to allow separation of large amounts of gases or liquids. Permeance, measured in Gas Permeation Units (GPU, 1 GPU=$10^{-6}$ cm$^3$ (STP)/cm$^2$ s (cm Hg)), is the pressure normalized flux and is equal to permeability divided by the skin layer thickness of the membrane. Commercially available gas separation polymer membranes, such as CA, polyimide, and polysulfone membranes formed by phase inversion and solvent exchange methods have an asymmetric integrally skinned membrane structure. Such membranes are characterized by a thin, dense, selectively semipermeable surface "skin" and a less dense void-containing (or porous), non-selective support region, with pore sizes ranging from large in the support region to very small proximate to the "skin". However, fabrication of defect-free high selectivity asymmetric integrally skinned polyimide membranes is difficult. The presence of nanopores or defects in the skin layer reduces the membrane selectivity. The high shrinkage of the polyimide membrane on cloth substrate during membrane casting and drying process results in unsuccessful fabrication of asymmetric integrally skinned polyimide flat sheet membranes using phase inversion technique.

US 2005/0268783 A1 disclosed chemically cross-linked polyimide hollow fiber membranes prepared from a monoesterified polymer followed by final cross-linking after hollow fiber formation.

U.S. Pat. No. 7,485,173 disclosed UV cross-linked mixed matrix membranes via UV radiation. The cross-linked mixed matrix membranes comprise microporous materials dispersed in the continuous UV cross-linked polymer matrix.

U.S. Pat. No. 8,016,124 disclosed a thin film composite membrane (TFC) comprising a blend of polyethersulfone and aromatic polyimide polymers. The TFC membrane has a layer of a blend of polyethersulfone and aromatic polyimide with a thickness from about 0.1 to about 3 microns.

U.S. Pat. No. 8,337,598 disclosed a TFC hollow fiber membrane with a core player and a sheath UV-crosslinked polymer layer.

The selective thin layer on the non-selective porous layer of a thin film composite (TFC) membrane can be delaminated easily from the non-selective porous layer, which will result in significantly decreased selectivity for gas separations. On the other hand, the integrally-skinned asymmetric membranes have a selective thin layer and a porous layer from the same membrane material and formed from the same membrane solution at about the same time. Therefore, the selective thin layer of an integrally-skinned asymmetric membrane cannot be delaminated easily from the non-selective porous layer.

The present invention discloses asymmetric integrally-skinned flat sheet membranes and methods for making and using these membranes.

SUMMARY OF THE INVENTION

This invention pertains to asymmetric integrally-skinned polyimide/polyethersulfone blend flat sheet membranes with high performance for gas separations such as for H$_2$ purification and a process of using these membranes.

The present invention provides an asymmetric integrally-skinned flat sheet membrane comprising a miscible blend of an aromatic polyethersulfone (PES) polymer and an aromatic polyimide polymer that comprises a plurality of repeating units of formula (I)

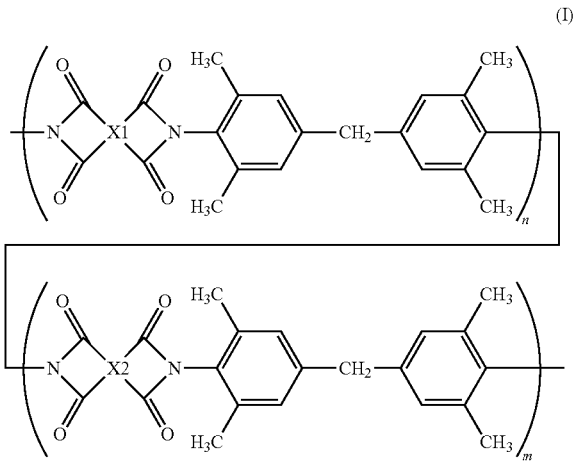

wherein X1 is selected from the group consisting of

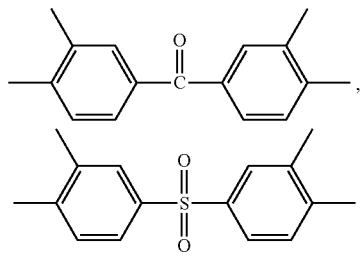

wherein X2 is selected from the group consisting of

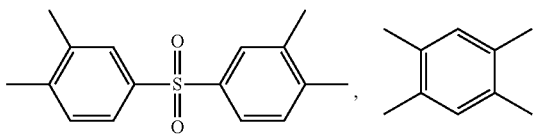

wherein n and m are independent integers from 20 to 500; wherein said asymmetric integrally-skinned flat sheet membrane has a layer of said miscible blend of said PES polymer and said aromatic polyimide polymer with a thickness from 60 microns to 230 microns, and wherein the surface of said layer of miscible blend with a thickness from 20 nm to 5 microns is UV cross-linked, and wherein the weight ratio of said aromatic PES polymer to said aromatic polyimide polymer is in a range of 1:5 to 5:1.

The UV cross-linked surface of the asymmetric integrally-skinned flat sheet membrane described in the present invention comprises PES and aromatic polyimide polymer chain segments where at least part of these polymer chain segments are cross-linked to each other through possible direct covalent bonds by exposure to UV radiation.

The asymmetric integrally-skinned flat sheet membranes were prepared by a phase inversion casting process, and then by applying UV radiation on the surface of the membrane.

One asymmetric integrally-skinned flat sheet membrane described in the present invention is fabricated from a blend of PES polymer and poly(3,3',4,4'-diphenylsulfone tetracarboxylic dianhydride-3,3',5,5'-tetramethyl-4,4'-methylene dianiline) (PI-A) which is derived from the condensation reaction of 3,3',4,4'-diphenylsulfone tetracarboxylic dianhydride (DSDA) with 3,3',5,5'-tetramethyl-4,4'-methylene dianiline (TMMDA). The weight ratio of PES to PI-A is 1:1. The blend PES-PI-A-3UV8 membrane with 3 minutes of UV treatment showed high $H_2/CH_4$ separation performance with $H_2$ permeance of 400 GPU and $H_2/CH_4$ selectivity of 145 for $H_2/CH_4$ separation. The blend PES-PI-A-1.75UV8 membrane with 1.75 minutes of UV treatment showed high $H_2/CH_4$ separation performance with $H_2$ permeance of 652 GPU and $H_2/CH_4$ selectivity of 100 for $H_2/CH_4$ separation.

Another asymmetric integrally-skinned flat sheet membrane described in the present invention is fabricated from a blend of PES polymer and poly(3,3',4,4'-benzophenone tetracarboxylic dianhydride-pyromellitic dianhydride-3,3',5,5'-tetramethyl-4,4'-methylene dianiline) (PI-B) derived from the condensation reaction of 3,3',4,4'-benzophenone tetracarboxylic dianhydride (BTDA, 50 mol-%) and pyromellitic dianhydride (PMDA, 50 mol-%) with 3,3',5,5'-tetramethyl-4,4'-methylene dianiline (TMMDA, 100 mol-%). The weight ratio of PES to PI-B is 1:1. The blend PES-PI-B-3UV7 membrane with 3 minutes of UV treatment showed high $H_2/CH_4$ separation performance with $H_2$ permeance of 458 GPU and $H_2/CH_4$ selectivity of 131 for $H_2/CH_4$ separation. The blend PES-PI-B-4UV7 membrane with 4 minutes of UV treatment showed high $H_2/CH_4$ separation performance with $H_2$ permeance of 337 GPU and $H_2/CH_4$ selectivity of 170 for $H_2/CH_4$ separation.

The invention provides a process for separating at least one gas from a mixture of gases using the asymmetric integrally-skinned polyimide/polyethersulfone blend flat sheet membrane described herein, the process comprising: (a) providing an asymmetric integrally-skinned polyimide/polyethersulfone blend flat sheet membrane described in the present invention which is permeable to said at least one gas; (b) contacting the mixture on one side of the asymmetric integrally-skinned polyimide/polyethersulfone blend flat sheet membrane to cause said at least one gas to permeate the membrane; and (c) removing from the opposite side of the membrane a permeate gas composition comprising a portion of said at least one gas which permeated said membrane.

The asymmetric integrally-skinned polyimide/polyethersulfone blend flat sheet membranes are not only suitable for $H_2$ purification application, but also suitable for a variety of other gas separations such as $CO_2/CH_4$, $O_2/N_2$, and $H_2S/CH_4$ separations.

DETAILED DESCRIPTION OF THE INVENTION

The use of membranes for separation of both gases and liquids is a growing technological area with potentially high economic reward due to the low energy requirements and the potential for scaling up of modular membrane designs. Advances in membrane technology, with the continuing development of new membrane materials and new methods for the production of high performance membranes will make this technology even more competitive with traditional, high-energy intensive and costly processes such as distillation.

Among the applications for large scale gas separation membrane systems are nitrogen enrichment, oxygen enrichment, hydrogen recovery, removal of hydrogen sulfide and carbon dioxide from natural gas and dehydration of air and natural gas. Also, various hydrocarbon separations are potential applications for the appropriate membrane system. The membranes that are used in these applications must have high selectivity, durability, and productivity in processing large volumes of gas or liquid in order to be economically successful. Membranes for gas separations have evolved rapidly in the past 25 years due to their easy processability for scale-up and low energy requirements. More than 90% of the membrane gas separation applications involve the separation of noncondensable gases: such as nitrogen from air, and hydrogen from nitrogen, argon or methane. Membrane gas separation is of special interest to petroleum producers and refiners, chemical companies, and industrial gas suppliers. Several applications of membrane gas separation have achieved commercial success, including nitrogen enrichment from air, hydrogen from nitrogen, argon or methane, carbon dioxide removal from natural gas and biogas and in enhanced oil recovery.

The present invention provides an asymmetric integrally-skinned polyimide/polyethersulfone blend flat sheet membrane. This invention also pertains to the application of the asymmetric integrally-skinned flat sheet membrane for $H_2$ purifications such as $H_2/CH_4$ separation, and also for a variety of other gas separations such as $CO_2/CH_4$, $CO_2/N_2$, olefin/paraffin (e.g. propylene/propane separation), and $O_2/N_2$ separations.

The asymmetric integrally-skinned flat sheet membrane in the present invention comprises a miscible blend of an aromatic polyethersulfone (PES) polymer and an aromatic polyimide polymer that comprises a plurality of repeating units of formula (I)

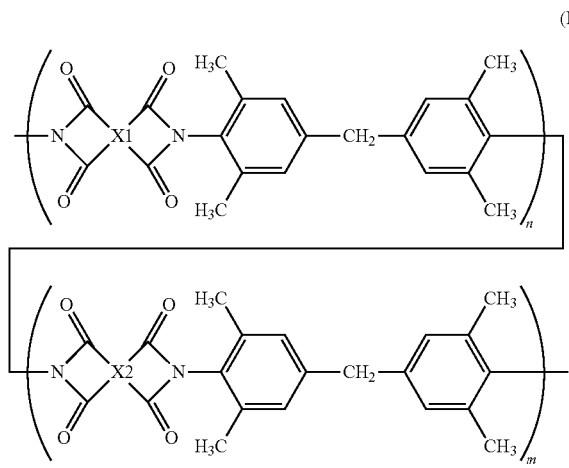

wherein X1 is selected from the group consisting of

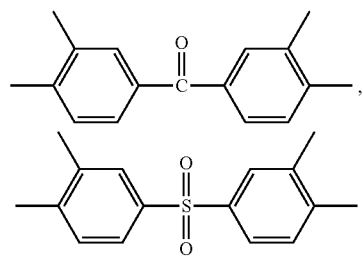

wherein X2 is selected from the group consisting of

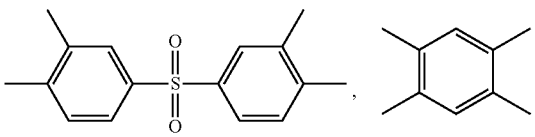

wherein n and m are independent integers from 20 to 500; wherein said asymmetric integrally-skinned flat sheet membrane has a layer of said miscible blend of said PES polymer and said aromatic polyimide polymer with a thickness from 60 microns to 230 microns, and wherein the surface of said layer of miscible blend with a thickness from 20 nm to 5 microns is UV cross-linked, and wherein the weight ratio of said aromatic PES polymer to said aromatic polyimide polymer is in a range of 1:5 to 5:1.

The UV cross-linked surface of the asymmetric integrally-skinned flat sheet membrane described in the present invention comprises PES and aromatic polyimide polymer chain segments where at least part of these polymer chain segments are cross-linked to each other through possible direct covalent bonds by exposure to UV radiation. The thickness of the UV cross-linked surface layer of the asymmetric integrally-skinned flat sheet membrane described in the present invention is in a range of 20 nm to 5 microns.

Some of the preferred aromatic polyimide polymers that are used for the formation of the asymmetric integrally-skinned polyimide/polyethersulfone blend flat sheet membrane in the present invention include, but are not limited to, poly(3,3',4,4'-diphenylsulfone tetracarboxylic dianhydride-3,3',5,5'-tetramethyl-4,4'-methylene dianiline) derived from the condensation reaction of 3,3',4,4'-diphenylsulfone tetracarboxylic dianhydride (DSDA) and 3,3',5,5'-tetramethyl-4,4'-methylene dianiline (TMMDA), referred to as PI-A; poly(3,3',4,4'-benzophenone tetracarboxylic dianhydride-pyromellitic dianhydride-3,3',5,5'-tetramethyl-4,4'-methylene dianiline) derived from the condensation reaction of 3,3',4,4'-benzophenone tetracarboxylic dianhydride (BTDA, 50 mol-%) and pyromellitic dianhydride (PMDA, 50 mol-%) with TMMDA (100 mol-%), referred to as PI-B; and poly(3,3',4,4'-diphenylsulfone tetracarboxylic dianhydride-pyromellitic dianhydride-3,3',5,5'-tetramethyl-4,4'-methylene dianiline) derived from the condensation reaction of DSDA (50 mol-%) and PMDA (50 mol-%) with TMMDA (100 mol-%), referred to as PI-C.

The casting dope formula for the preparation of the asymmetric integrally-skinned flat sheet membrane in the present invention comprises good solvents for the said aromatic polyimide polymer and said PES polymer such as N-methylpyrrolidone (NMP), N,N-dimethyl acetamide (DMAC), methylene chloride, N,N-dimethylformamide (DMF), dimethyl sulfoxide (DMSO), dioxanes, 1,3-dioxolane, mixtures thereof, others known to those skilled in the art and mixtures thereof, non-solvents for the said aromatic polyimide polymer and said PES polymer such as methanol, ethanol, iso-propanol, glycerol, acetone, n-octane, and lactic acid.

The invention provides a process for separating at least one gas from a mixture of gases using the asymmetric integrally-skinned polyimide/polyethersulfone blend flat sheet membrane described in the present invention, the process comprising: (a) providing an asymmetric integrally-skinned polyimide/polyethersulfone blend flat sheet membrane described in the present invention which is permeable to said at least one gas; (b) contacting the mixture on one side of the asymmetric integrally-skinned polyimide/polyethersulfone blend flat sheet membrane described in the present invention to cause said at least one gas to permeate the membrane; and (c) removing from the opposite side of the membrane a permeate gas composition comprising a portion of said at least one gas which permeated said membrane.

The asymmetric integrally-skinned polyimide/polyethersulfone blend flat sheet membrane described in the present invention is especially useful in the purification, separation or adsorption of a particular species in the liquid or gas phase. In addition to separation of pairs of gases, the asymmetric integrally-skinned polyimide/polyethersulfone blend flat sheet membrane described in the present invention may, for example, be used for the desalination of water by reverse osmosis or for the separation of proteins or other thermally unstable compounds, e.g. in the pharmaceutical and biotechnology industries. The asymmetric integrally-skinned polyimide/polyethersulfone blend flat sheet membrane described in the present invention may also be used in fermenters and bioreactors to transport gases into the reaction vessel and transfer cell culture medium out of the vessel. Additionally, the asymmetric integrally-skinned polyimide/polyethersulfone blend flat sheet membrane described in the present invention may be used for the removal of microorganisms from air or water streams, water purification, ethanol production in a continuous fermentation/membrane pervaporation system, and in detection or removal of trace compounds or metal salts in air or water streams.

The asymmetric integrally-skinned polyimide/polyethersulfone blend flat sheet membrane described in the present invention is especially useful in gas separation processes in air purification, petrochemical, refinery, and natural gas industries. Examples of such separations include separation of volatile organic compounds (such as toluene, xylene, and acetone) from an atmospheric gas, such as nitrogen or oxygen and nitrogen recovery from air. Further examples of such separations are for the separation of $CO_2$ or $H_2S$ from natural gas, $H_2$ from $N_2$, $CH_4$, and Ar in ammonia purge gas streams, $H_2$ recovery in refineries, olefin/paraffin separations such as propylene/propane separation, and iso/normal paraffin separations. Any given pair or group of gases that differ in molecular size, for example nitrogen and oxygen, carbon dioxide and methane, hydrogen and methane or carbon monoxide, helium and methane, can be separated using the asymmetric integrally-skinned polyimide/polyethersulfone blend flat sheet membrane described in the present invention. More than two gases can be removed from a third gas. For example, some of the gas components which can be selectively removed from a raw natural gas using the membrane described herein include carbon dioxide, oxygen, nitrogen, water vapor, hydrogen sulfide, helium, and other trace gases. Some of the gas components that can be selectively retained include hydrocarbon gases. When permeable components are acid components selected from the group consisting of carbon dioxide, hydrogen sulfide, and mixtures thereof and are removed from a hydrocarbon mixture such as natural gas, one module, or at least two in parallel service, or a series of modules may be utilized to remove the acid components. For example, when one module is utilized, the pressure of the feed gas may vary from 275 kPa to about 2.6 MPa (25 to 4000 psi). The differential pressure across the membrane can be as low as about 70 kPa or as high as 14.5 MPa (about 10 psi or as high as about 2100 psi) depending on many factors such as the particular membrane used, the flow rate of the inlet stream and the availability of a compressor to compress the permeate stream if such compression is desired. Differential pressure greater than about 14.5 MPa (2100 psi) may rupture the membrane. A differential pressure of at least 0.7 MPa (100 psi) is preferred since lower differential pressures may require more modules, more time and compression of intermediate product streams. The operating temperature of the process may vary depending upon the temperature of the feed stream and upon ambient temperature conditions. Preferably, the effective operating temperature of the membranes of the present invention will range from about −50° to about 150° C. More preferably, the effective operating temperature of the asymmetric integrally-skinned polyimide/polyethersulfone blend flat sheet membrane of the present invention will range from about −20° to about 100° C., and most preferably, the effective operating temperature of the membranes of the present invention will range from about 25° to about 100° C.

The asymmetric integrally-skinned polyimide/polyethersulfone blend flat sheet membrane described in the present invention are also especially useful in gas/vapor separation processes in chemical, petrochemical, pharmaceutical and allied industries for removing organic vapors from gas streams, e.g. in off-gas treatment for recovery of volatile organic compounds to meet clean air regulations, or within process streams in production plants so that valuable compounds (e.g., vinylchloride monomer, propylene) may be recovered. Further examples of gas/vapor separation processes in which the asymmetric integrally-skinned polyimide/polyethersulfone blend flat sheet membrane described in the present invention may be used are hydrocarbon vapor separation from hydrogen in oil and gas refineries, for hydrocarbon dew pointing of natural gas (i.e. to decrease the hydrocarbon dew point to below the lowest possible export pipeline temperature so that liquid hydrocarbons do not separate in the pipeline), for control of methane number in fuel gas for gas engines and gas turbines, and for gasoline recovery. The asymmetric integrally-skinned polyimide/polyethersulfone blend flat sheet membrane described in the present invention may incorporate a species that adsorbs strongly to certain gases (e.g. cobalt porphyrins or phthalocyanines for $O_2$ or silver (I) for ethane) to facilitate their transport across the membrane.

The asymmetric integrally-skinned polyimide/polyethersulfone blend flat sheet membrane described in the present invention also has immediate application to concentrate olefin in a paraffin/olefin stream for olefin cracking application. For example, the asymmetric integrally-skinned polyimide/polyethersulfone blend flat sheet membrane described in the present invention can be used for propylene/propane separation to increase the concentration of the effluent in a catalytic dehydrogenation reaction for the production of propylene from propane and isobutylene from isobutane. Therefore, the number of stages of a propylene/propane splitter that is required to get polymer grade propylene can be reduced. Another application for the asymmetric integrally-skinned polyimide/polyethersulfone blend flat sheet membrane described in the present invention is for separating isoparaffin and normal paraffin in light paraffin isomerization and MaxEne™, a process for enhancing the concentration of normal paraffin (n-paraffin) in the naphtha cracker feedstock, which can be then converted to ethylene.

The asymmetric integrally-skinned polyimide/polyethersulfone blend flat sheet membrane described in the present invention can also be operated at high temperature to provide the sufficient dew point margin for natural gas upgrading (e.g, $CO_2$ removal from natural gas). The asymmetric integrally-skinned flat sheet membrane described in the present invention can be used in either a single stage membrane or as the first or/and second stage membrane in a two stage membrane system for natural gas upgrading.

EXAMPLES

The following examples are provided to illustrate one or more preferred embodiments of the invention, but are not limited embodiments thereof. Numerous variations can be made to the following examples that lie within the scope of the invention.

Example 1

Preparation of PES-PI-A-1.75UV8 and PES-PI-A-3UV8 Asymmetric Integrally-Skinned Flat Sheet Membranes A membrane casting dope containing PI-A, PES, NMP, 1,3-dioxolane, and non-solvents with a PI-A to PES weight ratio of 1:1 was cast on a highly porous non-selective symmetric woven Nylon 6,6 fabric backing at a casting speed of 6 fpm at room temperature. The cast membrane was evaporated for 13 seconds to form the nascent asymmetric integrally-skinned flat sheet PES-PI-A membrane with a thin dense selective skin layer of a blend of PI-A and PES polymers on the surface. The membrane was immersed into a cold water coagulation tank to generate the porous PI-A/PES polymer blend non-selective asymmetric layer below the thin dense selective skin layer by phase inversion. The wet membrane was then immersed into a hot water tank to remove the trace amount of organic solvents in the membrane. Finally the wet membrane was wound up on a core roll for further drying. The wet polyimide membrane was dried at 70-95° C. The thin dense selective skin layer surface of the blend of PI-A and PES polymers for the dried membrane was then coated with a thin non-porous layer of epoxysilicone rubber. The epoxysilicone rubber coating layer and the thin dense selective skin layer surface of the coated asymmetric integrally-skinned PI-A/PES blend flat sheet membrane was cross-linked via UV radiation for 1.75 min and 3 min, respectively, using a UV lamp with intensity of 1.45 mW/cm² to produce PES-PI-A-1.75UV8 and PES-PI-A-3UV8 asymmetric integrally-skinned flat sheet membranes, respectively.

Example 2

Preparation of PES-PI-B-3UV7 and PES-PI-B-4UV7 Asymmetric Integrally-Skinned Flat Sheet Membranes PES-PI-B-3UV7 and PES-PI-B-4UV7 asymmetric integrally-skinned flat sheet membranes were prepared using the same procedure as for PES-PI-A-1.75UV8 and PES-PI-A-3UV8 asymmetric integrally-skinned flat sheet membranes described in Example 1, but a miscible blend of PI-B polyimide and PES polymer with a weight ratio of 1:1 was used instead of a miscible blend of PI-A polyimide and PES polymer.

Example 3

Evaluation of $CO_2/CH_4$ separation performance of PES-PI-A-1.75UV8, PES-PI-A-3UV8, PES-PI-B-3UV7, and PES-PI-B-4UV7 asymmetric integrally-skinned flat sheet membranes The PES-PI-A-1.75UV8, PES-PI-A-3UV8, PES-PI-B-3UV7, and PES-PI-B-4UV7 asymmetric integrally-skinned flat sheet membranes were tested for $CO_2/CH_4$ separation at 50° C. under 6996 kPa (1000 psig) feed gas pressure with 10% of $CO_2$ and 90% of $CH_4$ in the feed. The results are shown in Table 1. It can be seen from Table 1 that all membranes described in the current invention showed high $CO_2$ permeances of over 70 GPU and high $CO_2/CH_4$ selectivities over 23.

TABLE 1

$CO_2/CH_4$ separation performance of PES-PI-A-1.75UV8, PES-PI-A-3UV8, PES-PI-B-3UV7, and PES-PI-B-4UV7 asymmetric integrally-skinned flat sheet membranes

| Membrane | $CO_2$ permeance (GPU) | $CO_2/CH_4$ selectivity |
|---|---|---|
| PES-PI-A-1.75UV8 | 140 | 23.1 |
| PES-PI-A-3UV8 | 70 | 29.3 |
| PES-PI-B-3UV7 | 82 | 24.9 |
| PES-PI-B-4UV7 | 69 | 28.6 |

1 GPU = $10^{-6}$ cm³ (STP)/cm² s (cm Hg)

Testing conditions: 50° C. 6996 kPa (1000 psig) feed gas pressure, 10% $CO_2$ and 90% of $CH_4$ in the feed.

Example 4

Evaluation of $H_2/CH_4$ separation performance of PES-PI-A-1.75UV8, PES-PI-A-3UV8, PES-PI-B-3UV7, and PES-PI-B-4UV7 Asymmetric Integrally-Skinned Flat Sheet Membranes The PES-PI-A-1.75UV8, PES-PI-A-3UV8, PES-PI-B-3UV7, and PES-PI-B-4UV7 asymmetric integrally-skinned flat sheet membranes were tested for $H_2/CH_4$ separation at 50° C. under 6996 kPa (1000 psig) feed gas pressure with 10% of $H_2$ and 90% of $CH_4$ in the feed. The results are shown in Table 2. It can be seen from Table 2 that all membranes described in the current invention showed high $H_2$ permeances of over 330 GPU and high $H_2/CH_4$ selectivities of 100 or above.

TABLE 2

$H_2/CH_4$ separation performance of PES-PI-A-1.75UV8, PES-PI-A-3UV8, PES-PI-B-3UV7, and PES-PI-B-4UV7 asymmetric integrally-skinned flat sheet membranes

| Membrane | $H_2$ permeance (GPU) | $H_2/CH_4$ selectivity |
|---|---|---|
| PES-PI-A-1.75UV8 | 651 | 100 |
| PES-PI-A-3UV8 | 424 | 146 |
| PES-PI-B-3UV7 | 458 | 131 |
| PES-PI-B-4UV7 | 337 | 170 |

1 GPU = $10^{-6}$ cm³ (STP)/cm² s (cm Hg)

Testing conditions: 50° C., 6996 kPa (1000 psig) feed gas pressure, 10% $H_2$ and 90% of $CH_4$ in the feed.

The invention claimed is:

1. An asymmetric integrally-skinned flat sheet gas separation membrane comprising a highly porous, non-selective symmetric woven Nylon fabric backing, a miscible blend of an aromatic polyethersulfone (PES) polymer and an aromatic polyimide polymer that comprises a plurality of repeating units of formula (I)

(I)

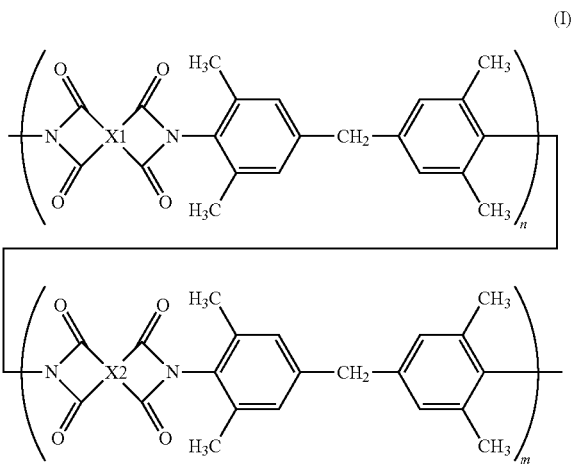

wherein X1 is selected from the group consisting of

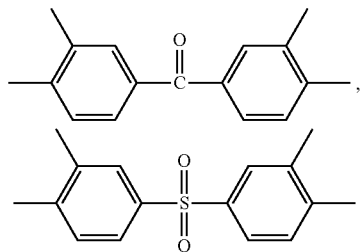

wherein X2 is selected from the group consisting of

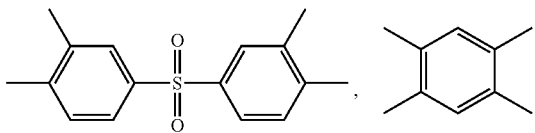

wherein n and m are independent integers from 20 to 500 wherein said asymmetric integrally-skinned flat sheet membrane has a layer of said miscible blend of said PES polymer and said aromatic polyimide polymer with a thickness from 60 microns to 230 microns, and wherein said membrane has a hydrogen over methane selectivity of at least 100.

2. The asymmetric integrally-skinned flat sheet membrane of claim 1 wherein the surface of said layer of miscible blend is UV cross-linked.

3. The asymmetric integrally-skinned flat sheet membrane of claim 1 wherein the weight ratio of said PES polymer to said aromatic polyimide polymer is in a range of 1:5 to 5:1.

4. The asymmetric integrally-skinned flat sheet membrane of claim 1 comprises PES and aromatic polyimide polymer chain segments where at least part of these polymer chain segments are cross-linked to each other through direct covalent bonds by exposure to UV radiation.

5. The asymmetric integrally-skinned flat sheet membrane of claim 1 wherein said aromatic polyimide polymer is selected from the group consisting of poly(3,3',4,4'-diphenylsulfone tetracarboxylic dianhydride-3,3',5,5'-tetramethyl-4,4'-methylene dianiline); poly(3,3',4,4'-benzophenone tetracarboxylic dianhydride-pyromellitic dianhydride-3,3',5,5'-tetramethyl-4,4'-methylene dianiline) and poly(3,3',4,4'-diphenylsulfone tetracarboxylic dianhydride-pyromellitic dianhydride-3,3',5,5'-tetramethyl-4,4'-methylene dianiline).

6. The asymmetric integrally-skinned flat sheet membrane of claim 1 comprising a blend of said PES polymer and poly(3,3',4,4'-diphenylsulfone tetracarboxylic dianhydride-3,3',5,5'-tetramethyl-4,4'-methylene dianiline).

7. The asymmetric integrally-skinned flat sheet membrane of claim 1 comprising a blend of said PES polymer and poly(3,3',4,4'-benzophenone tetracarboxylic dianhydride-pyromellitic dianhydride- 3,3',5,5'-tetramethyl-4,4'-methylene dianiline).

* * * * *